United States Patent Office 3,095,984
Patented July 2, 1963

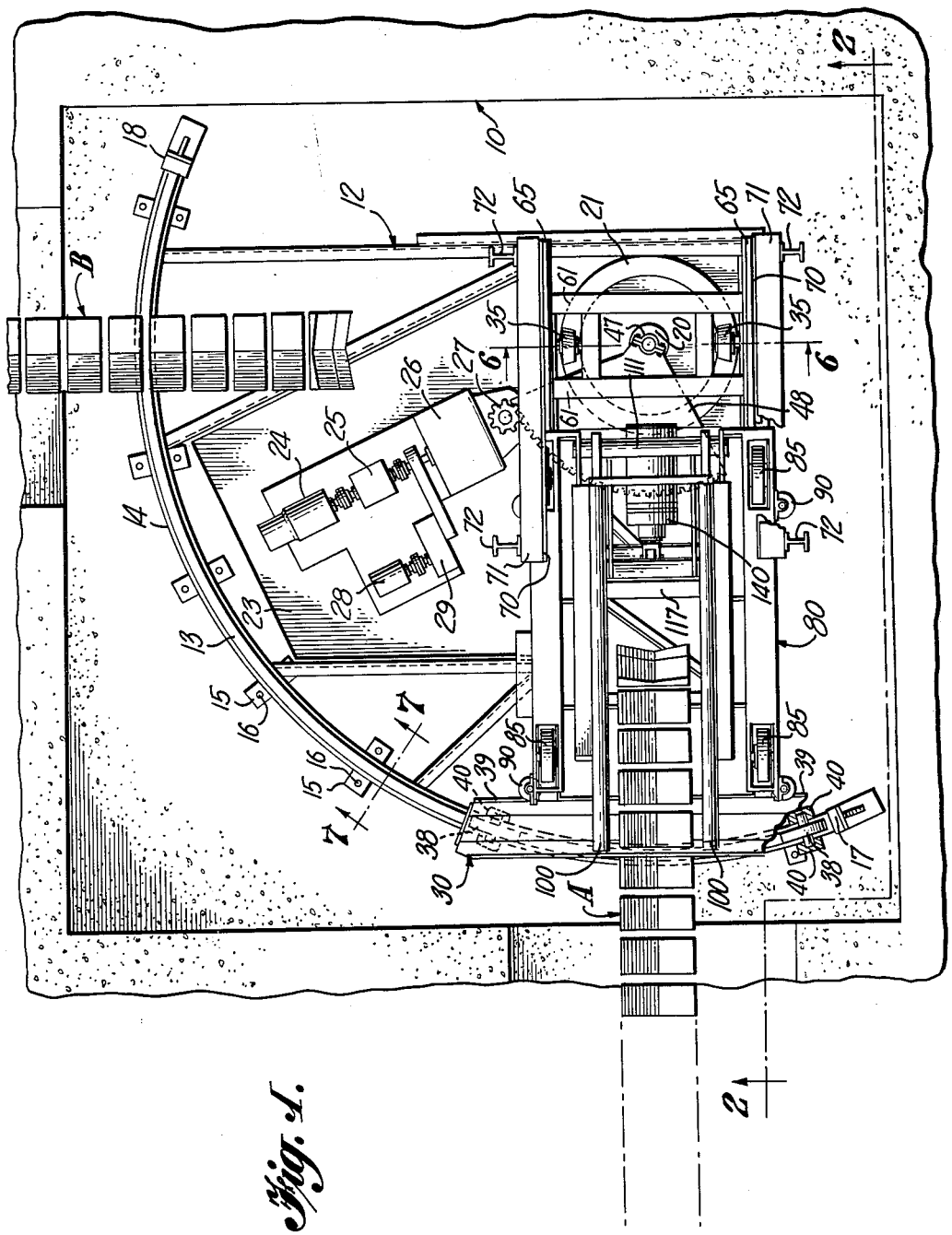

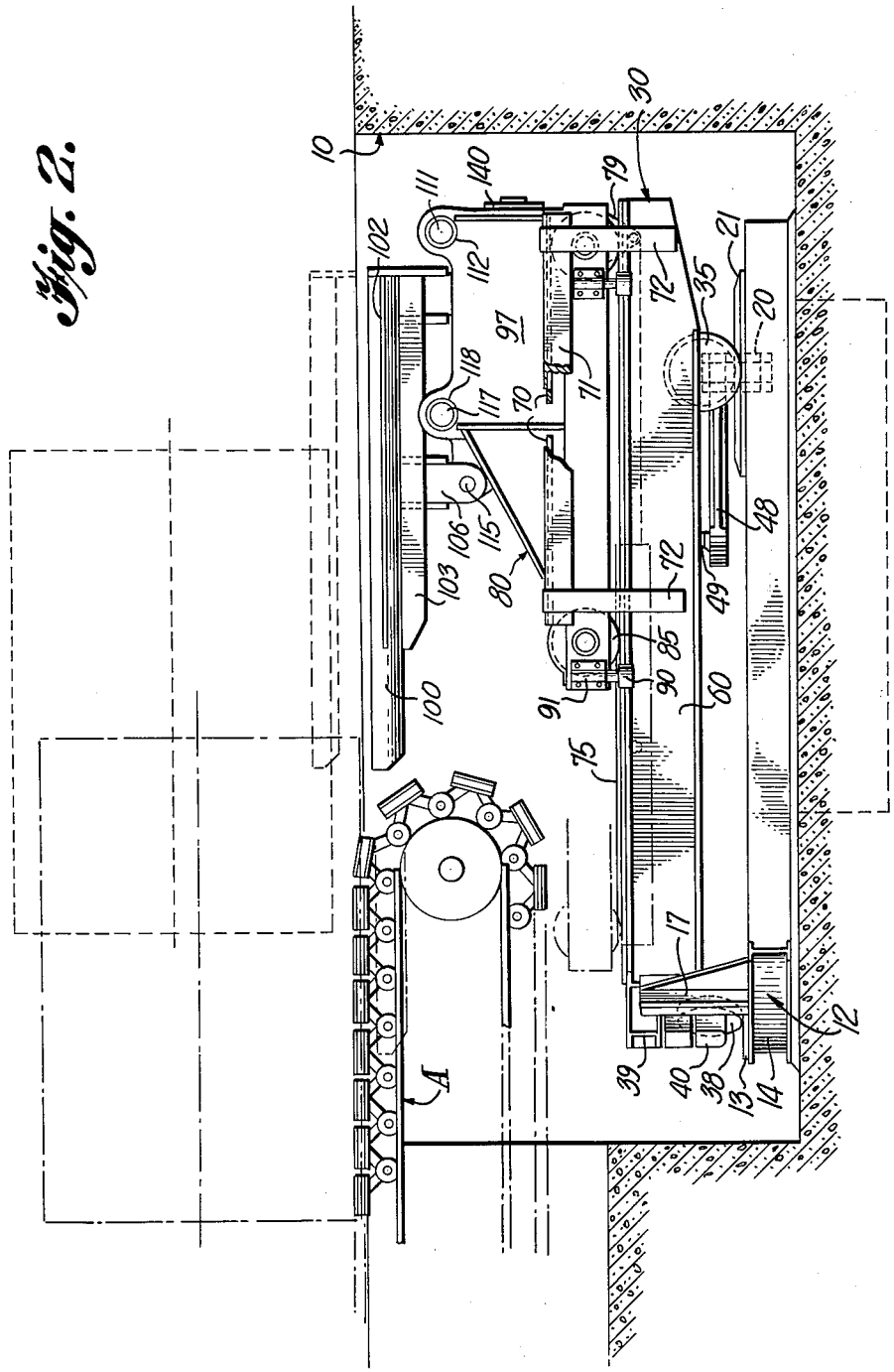

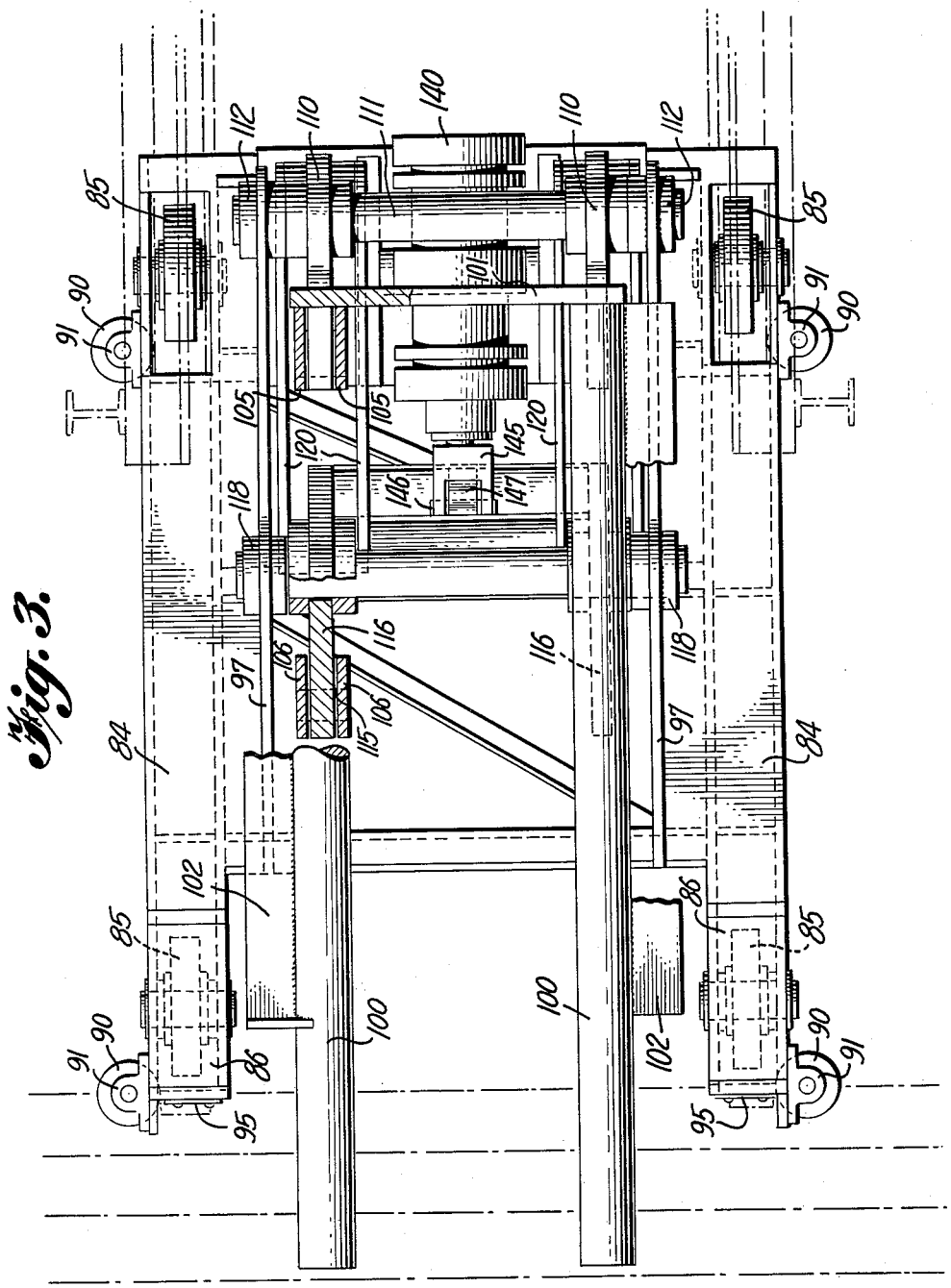

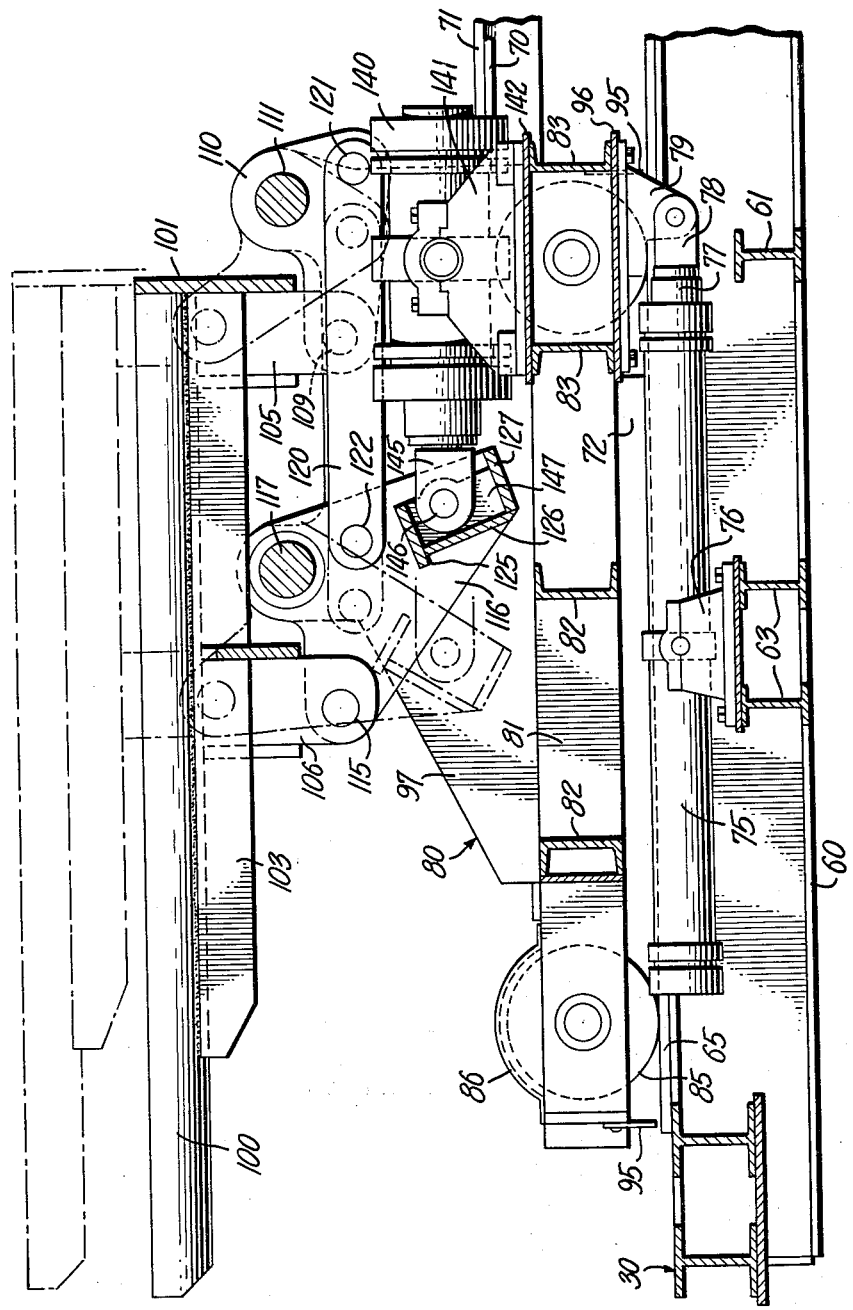

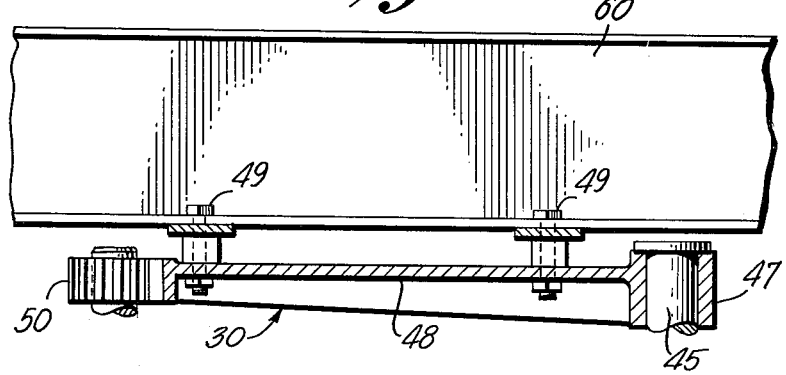
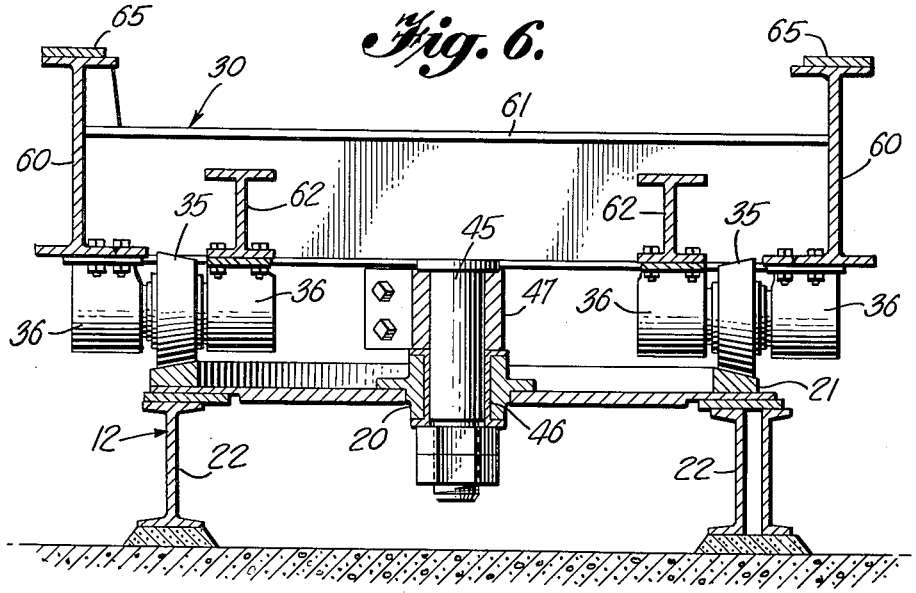
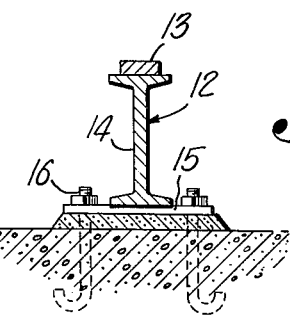

3,095,984
ARTICLE HANDLING EQUIPMENT
Gustav A. Lindkvist, Evanston, Ill., assignor to Link-Belt Company, a corporation of Illinois
Filed Jan. 23, 1961, Ser. No. 84,373
15 Claims. (Cl. 214—1)

This invention relates generally to the art of article handling. More specifically, the invention is directed to apparatus for transferring articles, and particularly heavy bulky articles such as metal strip coils, between a pick-up position and a discharge position.

The apparatus of the instant invention finds an application in the instance where articles conveyed on one conveyor are to be transferred from such conveyor to another conveyor. One specific application for the apparatus occurs where the paths of two conveyors are disposed at a predetermined angle to each other. In such case the article transfer apparatus can be disposed adjacent the ends of the conveyors to remove articles in succession from the one conveyor and transfer them to the end of the other conveyor.

In the particular embodiment illustrated and described in detail hereinafter, the transfer apparatus is employed to handle coils of strip metal such as aluminum, steel, etc. The two conveyors between which transfer is to be effected are constructed with a generally V-grooved top surface running longitudinally of the load carrying surface of the conveyors and the conveyor paths being disposed at 90° to each other. Each coil is disposed in the trough with the axis thereof extending parallel to the path of movement of the conveyor. In using the transfer apparatus with this arrangement each coil is picked up from the end of one conveyor, shifted through an arc to the other conveyor and deposited on the other conveyor with its axis parallel to the conveyor path of the other conveyor. Although this specific use for and mode of application of the article transfer apparatus are described in detail herein, it is to be understood that the apparatus has a wide range of applications and uses aside from its particular utility in the transfer of strip metal coil articles and that the specific description is not to be considered limiting on the possible fields of use of apparatus incorporating the features of the invention embraced by the appended claims.

In the handling of large articles in industrial plants, warehouses, etc., there may arise instances where such articles being conveyed in one direction or path of movement must be transferred from this conveying path to a second conveying path extending at a predetermined angular relation to the first path. Not infrequently, the character of the article is such that its handling during conveying, including transfer between two angularly related conveying paths, must be carried out with extreme care against damage to the article's surface. Also with extremely heavy and bulky articles, the conveying between angularly related paths presents special problems in the construction of apparatus which may effect the transfer while still avoiding or minimizing damage to the article transferred.

In the conveying of coiled strip aluminum, as one specific application for the apparatus herein, particular problems must be kept in mind such as the relatively soft character of the metal strip which makes it particularly prone to marring by denting or gouging. Also, with all unbanded coiled metal strip, it is important to avoid severe jarring or rough handling of the coil which might cause it to partially uncoil before being banded. This latter problem arises when the transfer apparatus is to be employed in transferring coils from a conveyor carrying unbanded coils and transfer the coils to a second conveyor where the coil is subsequently banded.

Having in mind the above problems and considerations, the instant invention has for its principal object the provision of an improved article transfer apparatus whereby successive articles may be removed from a pickup position and transferred to a discharge position with the axis of the article before and after transfer having a predetermined angular relation.

A further principal object of the instant invention is to provide an improved article transfer apparatus in combination with two conveyors, the paths of which are disposed at a predetermined angle to one another, and wherein the apparatus is effective to successively transfer particularly large and heavy articles from the end of one conveyor onto the end of the other conveyor.

It is a further object of the instant invention to provide article transfer apparatus whereby the handling of bulky articles may be readily effected without injury or damage to the articles transferred.

It is also an object of this invention to provide a transfer apparatus to be disposed at the ends of angularly related conveyors with a turntable mounted to swing on an axis coinciding with the point of intersection of the conveying paths of the conveyors, such turntable being provided with a carriage having elevatable article lifting means thereon and the carriage being reciprocable on the turntable in conjunction with elevation of the lifting means in removal of an article from one conveyor and its transfer to the other conveyor.

The above and other more specific objects and novel features of the instant invention will be apparent from the following description taken in conjunction with the accompanying drawings. It is to be expressly understood, however, that the drawings are for the purpose of illustration only and are not intended to define the limits of the invention but rather to merely illustrate a preferred embodiment and structure incorporating the features of the instant invention.

In the accompanying drawings forming a part of this specification and wherein like reference characters are employed to designate like parts throughout the several views:

FIGURE 1 is a plan view of the article transfer apparatus showing schematically its relation to a pair of angularly related conveyors and with parts broken away to illustrate certain details of the apparatus;

FIGURE 2 is a side elevational view taken on line 2—2 of FIGURE 1 showing the transfer carriage in its retracted position;

FIGURE 3 is a plan view showing details of the transfer carriage with parts of the transfer turntable illustrated in phantom;

FIGURE 4 is a longitudinal sectional view through the transfer carriage more specifically illustrating the linkage employed in elevating the lifting arms;

FIGURE 5 is a detail view showing the manner in which the driving gear segment is affixed to the turntable to effect swinging movements thereof;

FIGURE 6 is a sectional view taken on line 6—6 of FIGURE 1 omitting showing of the hold down tracks and mounting therefor; and FIGURE 7 is a sectional view taken on line 7—7 of FIGURE 1.

*General Apparatus Description*

The plan view in FIGURE 1 shows the article transfer apparatus in a particular installation as it may be adapted in use. In this installation a first conveyor A is shown ending at a point spaced from a second conveyor B with the conveyor paths being disposed at an angle of 90° to each other. As specifically illustrated the conveyors A and B are mounted in trenches such that the strip metal coil articles being conveyed thereby are carried essentially at floor level. For use in conveying coils of metal strip the conveyors are provided with generally V-grooved top surfaces, extending longitudinally of the conveyor path such that each coil rests in this V-groove with the axis thereof essentially parallel to the conveyor path.

The conveyors A and B terminate in a pit 10 in which the article transfer apparatus is mounted to lift in succession the coils from the end of conveyor A and transfer them to the end of conveyor B for such coil articles to continue on the course of conveyor B.

Before undertaking a detailed description of the transfer apparatus of this invention, a brief summary of the basic operational features of the apparatus may be helpful. In the specific embodiment illustrated the transfer apparatus is mounted at the point of intersection of the conveying paths of the two conveyors A and B. In this installation the conveyors terminate short of the point where their conveying paths would intersect and the transfer apparatus carries out the operation of picking up the article from the end of one conveyor and depositing it on the end of the other conveyor.

Basically the transfer apparatus includes a turntable which is mounted to pivot about an axis which coincides with the point of intersection of the conveyor paths A and B. A carriage is mounted on the turntable to be movable toward and away from the end of the particular conveyor with which the turntable is aligned. The carriage has lifting arms which are elevatable to pick up the articles from the end of one conveyor and are lowerable to deposit the article on the end of the other conveyor.

*General Operation of Transfer Apparatus*

With the carriage lifting arms lowered and the carriage retracted on the turntable, the turntable is aligned with the end of one conveyor. Thereupon the carriage is extended on the turntable. In this state the turntable and carriage have the relation to the conveyor as shown with respect to conveyor A on FIGURE 1. The lifting arms on the carriage are then elevated to raise them above the surface of the conveyor and in so doing the article is picked up and is now supported on the carriage lifting arms. The carriage is retracted with the article supported on the lifting arms and thereafter the turntable swung to position it in alignment with the end of the other conveyor. In this position the carriage is again extended whereby the lifting arms dispose the article above the end of the other conveyor. Thereupon the lifting arms are lowered so that the article is deposited on the end of the conveyor. The carriage is then retracted and the turntable swung back into alignment with the first conveyor in readiness to transfer another article.

*Base Mounting Structure*

Turning now to a specific description of the transfer apparatus, the apparatus includes a base structure 12 which is fixedly secured on the floor of pit 10. This base structure includes a framework provided with an arcuate rail 13 which is mounted on an I-cross section member 14. This member is fastened to the floor of pit 10 by plates 15 engaged by holddown bolts 16 which are suitably imbedded in the concrete floor of pit 10. The construction and mounting of rail 13 on member 14 is shown more clearly in cross section in FIGURE 7.

The rail 13 is provided with a stop 17 at one end and a stop 18 at the opposite end. These stops are of similar construction and are alternately engaged by the transfer turntable described below at the extreme positions of swinging movement of the turntable. As will be apparent from the description hereinbelow, when the turntable is engaged with one or the other of the end stops 17 or 18, it will be aligned with one or the other of the conveyors A or B to pick up or discharge an article from these conveyors.

Also provided on the base structure 12 is a pivot mounting 20. This mounting provides a vertical pivot axis which it is to be noted coincides with the point of intersection of the conveyor paths A and B. Encircling the pivot mounting 20 there is mounted a rail 21 in the form of a ring, this rail being supported from the floor of pit 10 on load carrying members which form a part of structure 12 and where are illustrated more clearly at 22 in the sectional view of FIGURE 6.

A platform 23 is also fixedly secured with base structure 12 on the floor of pit 10. This platform provides a mounting base for the turntable drive means and related equipment employed in effecting swinging movement of the transfer turntable as described hereinbelow. The platform supports the drive motor 24 which may be provided with a built-in disc brake to promptly decelerate the motor upon its being de-energized. The motor is coupled through an eddy current brake 25 to the input shaft of a right angle speed reducer 26. A drive pinion 27 is mounted on the vertical output shaft of speed reducer 26, this pinion, by its engagement with a gear segment secured to a turntable, effecting swinging movement of the turntable.

As illustrated, a rotary switch 28 is connected through a speed reducer 29, suitably driven as by a chain drive from the shaft between brake 25 and speed reducer 26. The rotary switch 28 is employed to control energization of the eddy current brake 25 as will be described more fully hereinafter. The eddy current brake is employed to rapidly decelerate the swinging movement of the turntable near the end of its swing and thereby minimize impact when the turntable engages one of the stops 17 or 18. The use of this motor and eddy current brake combination permits the drive means to effect relatively rapid swing of the turntable during the main portion of the transfer operation while slowing the swing at the ends of travel so that the turntable is eased into engagement with one or the other stops.

*Transfer Turntable*

A turntable 30 is mounted on the base structure 12 to be pivotal about the pivot mounting 20 on structure 12. To support the extreme weight which may be encountered in transferring metal strip coil articles, the turntable has mounted thereon a pair of rollers 35 which as shown in FIGURES 1 and 6 are disposed on opposite sides of the pivot mounting 20. These rollers 35 engage with the rail 21 on base structure 12 and have the shafts thereof journaled in suitable bearings 36 affixed to the underside of the turntable frame.

The outer end of the turntable 30, remote from pivot mounting 20, is also provided with load supporting rollers which are shown at 38, one such roller being provided beneath each wing 39 at the outer end of the turntable. The rollers 38 have the shafts thereof journaled in suitable bearings 40 which are secured on the underside of the respective wings 39. The mounting of these bearings 40 on the underside of each wing 39 preferably inclines the axis of the roller 38 downwardly toward pivot mounting 20. Thereby the axis of rollers 38 will be inclined so that the roller face mates with the horizontal surface of rail 13 as shown in FIGURE 7 so that there is no scuffing between the roller 38 and rail 13. To facilitate removal of debris or objects which may fall on rail 13 and would obstruct swinging movements of turntable 30, a wiper member may be secured on the side of each roller 38 to extend down to the rail surface so that as the turntable swings these wipers will clear the path for rollers 38.

The pivot mounting 20 on structure 12 has a pin 45 journaled in bearing sleeve 46 as shown more clearly in FIGURE 6. The split hub 47 of a gear segment 48 is clamped on the upper end of pin 45. This gear segment is bolted on the underside of the turntable frame members as shown at 49 in FIGURE 5 and is engaged with a drive pinion 27 keyed to the upper end of the output shaft of speed reducer 26.

The turntable 30 has a framework constructed with longitudinal I-beams 60 extending along opposite sides thereof. These are interconnected and tied together by a series of connecting members such, as for example, the I-beam members 61 and 63 as shown in FIGURES 1, 4 and 6. Bridging I-beams 62 are connected between the rear pair of members 61 and, as shown in FIGURE 6, the bearings 36 are bolted to the underside of beams 60 and 62. It may also be noted that the gear segment 48 is bolted to the underside of the particular member 61 and beam 60 where it passes beneath these elements. The forward end of turntable 30 and the wings 39 thereon are suitably formed by I-beam members secured across the outer end of beams 60 as shown in FIGURES 1, 2 and 4.

A pair of parallel tracks 65 are mounted on the upper surface of beams 60. As will be appreciated from FIGURE 1, the relationship of beams 60 and the tracks 65 mounted thereon is such that a radius extending through the pivot axis for the turntable bisects the space between these tracks. Thus, with the turntable located in the position shown in FIGURE 1, with the end of wing 39 in this figure engaged with the stop 17, the tracks 65 extend generally beneath the opposite sides of conveyor A at the outer end of the turntable. These tracks are engaged by the transfer carriage which is described in detail hereinafter.

The turntable 30 also carries a pair of parallel hold-down tracks 70 which are mounted on the turntable to overlie the rear portion of the tracks 65 adjacent the turntable pivot. These hold-down tracks are supported on opposite sides of the turntable frame. Each track is secured to the underside and along one leg of an angle 71. The other leg of this angle is fixed to the upper end of I-beam posts 72. The lower ends of posts 72 are suitably secured to the outer faces of beams 60 on the turntable frame. To obtain proper positioning of the posts 72 outwardly from the sides of beams 60, appropriate spacer blocks (not shown) may be disposed against the webs of beams 60 and the posts 72 secured, as by welding, to outer faces of such spacer blocks. The hold-down tracks also cooperate with the transfer carriage described hereinbelow.

As shown somewhat diagrammatically in FIGURE 2 and in more detail in FIGURE 4, a power actuating cylinder 75 is mounted on trunnions 76 which are in turn bolted to two of the connecting I-beam members 63 which bridge the longitudinal beams 60 of the turntable. The piston rod 77 of cylinder 75 is provided with a clevis 78 which is connected to a bracket 79 which bracket is fastened to the underside of the transfer carriage 80, described hereinafter.

*Transfer Carriage*

The carriage 80 has a built up chassis 81 including transverse channels 82 and 83 which tie together the longitudinal side assemblies of the chassis 84. Wheels 85 are journaled on pairs of stub axles at the front and rear ends of the side assemblies 84 to provide the carriage with four wheels, one at each of the four corners of the chassis 80. The pairs of wheels are spaced to cooperate with tracks 65 on turntable 30. Each of the front pair of wheels 85 is provided with a sheet metal wheel cover 86 as shown in FIGURES 3 and 4. These covers have been removed in FIGURE 1 to better illustrate the relation of these wheels to tracks 65. It will additionally be noted that the rear wheels 85 on the carriage 80 may also cooperate with the tracks 70 which overlie the rear portion of tracks 65 on the turntable. Thus in picking up a heavy article, the weight of the article may over- balance the carriage such that the rear carriage wheels will tend to rise from tracks 65. At this time, the rear wheels will engage hold-down tracks 70 and retain the carriage on the turntable.

In addition to the four load bearing wheels 85, a guide wheel 90 is mounted immediately forward of each wheel 85 with the wheels 90 being rotatable about vertical axes and positioned to engage the laterally outer edges of the tracks 65 as shown in FIGURES 1 and 2. These wheels 90 are rotatably mounted on bearings 91 affixed to the laterally outer sides of the respective side assemblies 84 of chassis 81. The wheels 90 serve to guide and retain the carriage with wheels 85 on tracks 65 during reciprocation of the carriage in picking up and depositing an article.

In order to clear the tracks 65 of any debris or object which may fall thereon and which would thereby obstruct movement of carriage 80 along the tracks 15, a wiper 95 is secured to the carriage in front of the forward wheel 85 on each side and behind the rear wheel 85 on each side. These wipers extend downwardly and terminate immediately above the track surface so as to engage and clear away any object which may be resting on the tracks.

The bracket 79 which as described above is connected to the piston rod of power actuating cylinder 75 to effect reciprocation of the carriage is bolted through a plate 96 to the underside of transverse chassis channels 83. It will thus be appreciated that by the introduction of fluid pressure such as hydraulic fluid pressure to the appropriate end of cylinder 75, the piston rod 77 will be ejected and through its connection to carriage 80 will retract the carriage from the position as shown in FIGURES 1 and 4 to the position shown in FIGURE 2. Similarly, the introduction of fluid pressure to the opposite end of cylinder 75 will be effective in extending the carriage.

The carriage 80 has a pair of upstanding support walls 97 which carry the spaced parallel lifting arms 100 and the linkage employed to effect raising and lowering of these arms while they are maintained in a substantially horizontal position while being elevated to lift the article to be transferred, all as best illustrated in FIGURES 3 and 4. As shown in FIGURE 2 the lifting arms are elevated beneath the article, such as a metal strip coil, so that the coil is cradled between the parallel arms and raised above the end of the conveyor by such elevating of the arms.

The arms 100 are connected at their rear ends by a tying plate 101. The arms have the form of cylindrical rods with a flange 102 welded along the laterally outer edge of each rod along the rear portion thereof. Flanges 103 are welded along the underside of each arm 100 and have connected thereto depending legs 105 at the rear end of each arm and depending legs 106 forwardly of the rear end of each arm. The rear legs 105 are pinned at 109 to a crank member 110. Member 110 is fixed to a shaft 111 which shaft extends between the support walls 97 and is journaled in such walls at 112.

The forward depending legs 106 on each arm 100 are pinned at 115 to an operating crank 116. The cranks 116 for both arms 100 are secured to a shaft 117 which extends between the support walls 97 and are journaled therein at 118. Links 120 are connected between the crank member 110 and operating crank 116 by being pinned to the former at 121 and pinned to the latter at 122.

The operating cranks 116 adjacent the opposite sides of support walls 97 of the carriage and beneath the respective lifting arms 100 are interconnected by means of cross bars 125, 126 and 127 which have their ends welded to the facing surfaces of the respective operating cranks 116. It will thus be seen that with the linkage positioned as shown in FIGURE 4, by swinging the operating cranks 116 the parallel lifting arms will be simultaneously raised while still being retained in a substantially horizontal plane during such raising. The raised position for the lifting arms and linkage is shown in phantom on FIGURE 4.

To effect raising and lowering of the lifting arms 100, a power actuating cylinder 140 is mounted on trunnions 141 which trunnions are secured on a plate 142 to the top of the transverse channels 83 of the carriage chassis 81. The piston rod of cylinder 140 has a clevis 145 mounted thereon which is pinned at 146 to a bridging member 147 rigidly secured to the cross bars 125, 126 and 127 which tie together the operating cranks 116.

To effect raising of the lifting arms 100 from the solid line position as shown in FIGURE 4, the introduction of fluid pressure, such as hydraulic fluid under pressure, to the rear end of power cylinder 140 will extend its piston rod and through the connection of clevis 145 to the bars tying together the operating cranks 116 will swing the cranks thereby raising the lifting arms 100. Similarly, by introducing fluid pressure to the forward end of the power cylinder 140 or by relieving fluid pressure in the rear end of such cylinder, the lifting arms will be lowered.

*Specific Operation of Apparatus*

The operation of the particular apparatus specifically described hereinabove may now be reviewed in the light of such specific description. The conveyors A and B at 90° to each other terminate short of the point at which the conveying paths would intercept. The turntable 30 with the carriage 80 mounted thereon is pivotally mounted to swing about the axis of pivot mounting 20 under control of motor 24 and eddy current brake 25.

It will be understood that the conveyor A is appropriately controlled in its operation so that it will advance an article such as a metal strip coil to the end thereof and stop, pending transfer of the article to the end of conveyor B by the article transfer apparatus. Conveyor B is similarly controlled to start and convey the article deposited thereon after the article has been deposited. The controls for advancing and stopping the conveyors may take a variety of forms and the disclosure herein does not include description thereof since they go beyond the invention herein.

In carrying out the operation of the transfer apparatus, suitable limit switches may be readily adapted and interconnected to respond to various movements of the elements of the transfer apparatus as well as to control the conveyors A and B. These switches and their interconnections are not illustrated herein. As in the case of intermittent operation of the conveyors A and B such that each remains stationary during the transfer operation, the controls for driving such conveyors as well as suitable controls for the motor 24, eddy current brake 25 and power cylinders 75 and 140 to carry out the desired operating sequence described herein are well known and their connections to operate the equipment are therefore not disclosed in this application.

With turntable 30 positioned to pick up the article from conveyor A the end of turntable wing 39 will be engaged with stop 17 such that the turntable will be aligned with conveyor A. The lifting arms 100 will be in a lowered position and the carriage is extended. With the carriage fully extended, the arms 100 are raised by introduction of fluid pressure into cylinder 140. As the arms pass upwardly on opposite sides of the end of conveyor A they lift the coil article off the conveyor end. After being fully raised fluid pressure is introduced into power cylinder 75 to retract the carriage 80 while keeping the arms 100 elevated. Once the carriage is retracted motor 24 is started which through drive pinion 27 swings the turntable 30 by engagement of the pinion with gear segment 48. As the turntable approaches completion of its swing arc and before it engages the opposite stop 18 rotary switch 28 closes to energize the eddy current brake to slow the approach of the turntable to the stop 18 and thereby avoid any serious jarring of the apparatus with the heavy metal strip coil supported thereon. Under this slowed condition the turntable engages with stop 18 to assure that the turntable is properly aligned with the end of conveyor B for depositing the coil article thereon. Thereupon the motor 24 and eddy current brake 25 are deenergized whereupon the motor disc brake brings the motor to a quick stop.

Fluid pressure is then introduced into power cylinder 75 to extend the carriage 80 on turntable 30, this operation being carried out with the lifting arms 100 still raised and the article supported thereon. When the carriage has been extended the article on the arms is disposed above the end of conveyor B which is stationary at this moment. The fluid pressure in cylinder 140 is relieved whereby the arms 100 are lowered to pass on opposite sides of the end of conveyor B and deposit the coil article on such conveyor. The carriage 80 is again retracted by means of power cylinder 75 and conveyor B started to carry away the article deposited thereon.

When the carriage has been retracted the motor 24 is operated in reverse to again swing the turntable back into alignment with conveyor A. When the arc of swing is nearly completed switch 28 closes whereby the eddy current brake 25 is energized to effect slowdown of the turntable swing while movement is continued until the turntable positively engages the stop 17 at which point the motor 24 is deenergized along with the eddy current brake 25 and the motor brake brings the motor to a stop. The carriage is again extended with the arms 100 lowered to dispose the arms below the sides of the end of conveyor A ready to start a new cycle in picking up a succeeding article from the end of conveyor A. It will, of course, be understood that during the transfer operation conveyor A will have moved another coil article onto the end thereof in readiness to be transferred to conveyor B.

It is to be understood that the form of this invention herewith shown and described is to be taken as a preferred example of the same, and that various changes in shape, size, and arrangement of parts may be resorted to without departing from the spirit of the invention or the scope of the subjoined claims.

I claim:

1. In combination with a pair of conveyors having the conveying paths thereof disposed at an angle to each other, apparatus for removing an article from the end of one of said conveyors and transferring it to the end of the other of said conveyors comprising a fixed base structure disposed intermediate the ends of said conveyors and providing a pivotal mounting means, a turntable mounted on said pivotal mounting means, means for effecting swinging of said turntable between a position aligned with said one conveyor and a position aligned with said other conveyor, a carriage mounted on said turntable to be movable inwardly and outwardly relative to the swing axis of said turntable, means for moving said carriage between extended and retracted positions on said turntable, lifting means carried by said carriage and mounted thereon to be elevatable to lift the article to be transferred, and means to effect raising of said lifting means to remove an article from the end of said one conveyor and to effect lowering of said lifting means to deposit the article on the end of said other conveyor.

2. In combination with an article transfer apparatus, first and second conveyors having the conveying paths thereof disposed at an angle to each other and with the ends of said conveyors spaced, a turntable swingably mounted in the space between the ends of said conveyors, means for effecting swinging of said turntable between positions aligned with the respective ends of said conveyors, a carriage movably mounted on said turntable, means for moving said carriage between extended and retracted positions on said turntable, parallel lifting arms carried by said carriage and mounted thereon to be elevatable to lift the article to be transferred, and means for raising said lifting arms with said carriage extended and said turntable aligned with said first conveyor to pass said lifting arms upwardly on opposite sides of said first conveyor to pick up an article thereon and for lowering said lifting arms with said carriage extended and said turntable aligned with said second conveyor to pass said lifting arms downwardly on opposite sides of said second conveyor to deposit the article thereon.

3. The combination as recited in claim 2 wherein said first named means comprises motor means connected to drive said turntable in its swinging movements and eddy current brake means connected to be energized to slow down swinging movement of said turntable as the turntable approaches one of said aligned positions.

4. In combination with a pair of conveyors having the conveying paths thereof disposed at an angle to each other, an article transfer apparatus comprising a base providing a pivotal mounting means with the axis thereof coinciding with the point of intersection of the conveying paths of said conveyors, a turntable pivotally connected to said pivotal mounting means to be swingable through an arc extending from a first position aligned with the conveying path of one of said conveyors to a second position aligned with the conveying path of the other of said conveyors, means for effecting swinging of said turntable between said positions, track means on said turntable, a carriage engaged with said track means to partake of guided movement on said turntable, means for moving said carriage between extended and retracted positions on said turntable, lifting means carried by said carriage and mounted thereon to be elevatable, and means for effecting raising of said lifting means with said carriage extended and said turntable in said first position to pick up an article on said one conveyor and for effecting lowering of said lifting means with said carriage extended and said turntable in said second position to deposit the article on said other conveyor.

5. Article transfer apparatus comprising a fixed base structure providing pivotal mounting means thereon, turntable means mounted on said base to be swingable through an arc about said pivotal mounting means from an article pickup position to an article discharge position, means for effecting swinging of said turntable means through said arc, said turntable means having track means thereon, a carriage engaged with said track means to provide guided movement of said carriage between extended and retracted positions on said turntable, means for moving said carriage between said extended and retracted positions, lifting means carried by said carriage and mounted thereon to be elevatable to lift the article to be transferred, and means for effecting raising and lowering of said lifting means.

6. Article transfer apparatus comprising a fixed base structure providing pivotal mounting means thereon, a turntable mounted on said base to be swingable through an arc about said pivotal mounting means from an article pickup position to an article discharge position, means connected between said base and turntable for effecting swinging of said turntable through said arc, said turntable having track means thereon, a carriage having means engaged with said track means to provide guided reciprocable movement of said carriage between extended and retracted positions on said turntable, means connected between said carriage and said turntable for reciprocating said carriage between said extended and retracted positions, lifting means carried by said carriage and mounted thereon to be elevatable in a generally horizontal position to lift the article to be transferred, and means on said carriage for effecting raising and lowering of said lifting means.

7. Article transfer apparatus comprising a fixed base structure providing pivotal mounting means thereon, turntable means mounted on said base to be swingable through an arc about said pivotal mounting means from an article pickup position to an article discharge position, means for effecting swinging of said turntable means through said arc, said turntable means having track means thereon, a carriage having means engaged with said track means to provide guided reciprocable movement of said carriage between extended and retracted positions on said turntable, means for reciprocating said carriage between said extended and retracted positions, lifting means carried by said carriage and mounted thereon to be elevatable in a generally horizontal position to lift the article to be transferred, and means for effecting raising and lowering of said lifting means.

8. Article transfer apparatus as recited in claim 7 wherein said means engaged with said track means includes load bearing wheels on said carriage, and said track means includes parallel tracks having upper faces to supportingly engage said wheels and hold-down tracks overlying said wheels and providing lower faces to supportingly engage said wheels against loads tending to raise said carriage.

9. Article transfer apparatus comprising a fixed base structure including an arcuate rail and a pivot mounting at the center of curvature of said rail, a turntable pivotally connected to said pivot mounting and having roller means engaged with said rail during swinging movements about said mounting through an arc extending from an article pickup position to an article discharge position, means for effecting swinging of said turntable through said arc, said turntable having track means thereon, a carriage engaged with said track means to provide guided movement of said carriage between extended and retracted positions on said turntable, means for moving said carriage between said extended and retracted positions, lifting arm means carried by said carriage and mounted thereon to be elevatable to lift the article to be transferred, and means for effecting raising and lowering of said arm means.

10. Article transfer apparatus comprising a fixed base structure including an arcuate rail and a pivot mounting at the center of curvature of said rail, a turntable pivotally connected to said pivot mounting and having roller means engaged with said rail during swinging movements about said mounting through an arc extending from an article pickup position to an article discharge position, means for effecting swinging of said turntable through said arc, said turntable having a pair of parallel tracks mounted thereon with a radius extending through said center of curvature bisecting the space between said tracks, a carriage having wheel means engaged with said tracks to provide guided reciprocable movement of said carriage between extended and retracted positions on said turntable, means for reciprocating said carriage between said extended and retracted positions, lifting arm means carried by said carriage and mounted thereon to be elevatable to lift the article to be transferred, and means for effecting raising and lowering of said lifting arm means.

11. Article transfer apparatus as recited in claim 10 wherein said wheel means includes load bearing wheels engaged with the upper faces of said tracks and guide wheels engaged with the lateral faces of said tracks.

12. Apparatus for transferring an article between a pair of conveyors whose conveying paths are disposed at an angle to each other comprising a base providing a pivotal mounting means thereon, a turntable pivotally connected to said pivotal mounting means to be swingable through an arc extending from a first position aligned with the conveying path of one conveyor to a second position aligned with the conveying path of the other conveyor, means for effecting swinging of said turntable through said arc, track means on said turntable, a carriage engaged with said track means to partake of guided movement on said turntable between extended and retracted positions, means for moving said carriage between said extended and retracted positions, parallel lifting arms carried by said carriage and mounted to be elevatable in a generally horizontal position, and means for effecting raising of said lifting arms with said carriage extended and said turntable in said first position to pass said lifting arms upwardly on opposite sides of one conveyor to pick up an article thereon and for effecting lowering of said lifting arms with said carriage extended and said turntable in said second position to pass said lifting arms downwardly on opposite sides of the other conveyor to deposit the article thereon.

13. Apparatus for transferring an article between a pair of conveyors whose conveying paths are disposed at an angle to each other comprising a base providing an arcuate rail and a pivot mounting at the center of curvature of said rail, a turntable pivotally connected to said pivot mounting and having roller means engaged with said rail during swinging movements through an arc extending from a first position aligned with the conveying path of one conveyor to a second position aligned with the conveying path of the other conveyor, means for effecting swinging of said turntable through said arc, a pair of parallel tracks mounted on said turntable, a carriage having wheel means engaged with said tracks to provide guided reciprocable movement of said carriage between extended and retracted positions on said turntable, means for reciprocating said carriage between said extended and retracted positions, parallel lifting arms carried by said carriage and mounted to be elevatable to pass on opposite sides of the end of the conveyors when said carriage is extended and said turntable is in one of said first or second positions, and means for effecting raising of said lifting arms to pick up an article from one conveyor when said carriage is extended and said turntable is in said first position and for effecting lowering of said lifting arms to deposit an article on the other conveyor when said conveyor is extended and said turntable is in said second position.

14. Apparatus for transferring an article between a pair of conveyors whose conveying paths are disposed at an angle to each other comprising a base providing arcuate rails and a pivot mounting at the center of curvature common to said arcuate rails, a turntable pivotally connected to said pivot mounting and having roller means engaged with said rails during swinging of said turntable through an arc extending from an article pick up position to an article discharge position, means for effecting swinging of said turntable through said arc, a pair of parallel tracks mounted on said turntable, a carriage having load bearing wheels engaged with the upper faces of said tracks and guide wheels engageable with the lateral faces of said tracks, fluid pressure operated means for reciprocating said carriage between extended and retracted positions on said turntable, parallel lifting arms carried by said carriage and mounted to be elevatable in a generally horizontal position to lift the article to be transferred, and fluid pressure operated means to effect raising and lowering of said lifting arms.

15. Article transfer apparatus comprising a fixed base structure providing pivotal mounting means thereon and stop means determining the limit of swing arc about said mounting means, turntable means mounted on said base to be swingable through said arc as limited by said stop means, motor means connected to drive said turntable means through said arc, eddy current brake means connected to be energized to slow down swinging movement of said turntable means upon approach to said stop means, track means on said turntable means, a carriage engaged with said track means to provide guided movement of said carriage between extended and retracted positions on said turntable, means for moving said carriage between said extended and retracted positions, lifting means carried by said carriage and mounted thereon to be elevatable to lift the article to be transferred, and means for effecting raising and lowering of said lifting means.

References Cited in the file of this patent

UNITED STATES PATENTS

| | | |
|---|---|---|
| 2,535,961 | Schutt | Dec. 26, 1950 |
| 2,541,574 | Crooks | Feb. 13, 1951 |
| 2,896,800 | Thomas | July 28, 1959 |